United States Patent [19]

Evans

[11] Patent Number: 4,995,634
[45] Date of Patent: Feb. 26, 1991

[54] EQUALIZING SUSPENSION ARRANGEMENT FOR TANDEM STEERING AXLES WITH COORDINATED GEOMETRY CONTROL OF NO. 2 STEERING AXLE

[75] Inventor: Maxwell E. Evans, Queensland, Australia

[73] Assignee: Mack Trucks, Inc., Allentown, Pa.

[21] Appl. No.: 392,557

[22] Filed: Aug. 11, 1989

[51] Int. Cl.⁵ .................................................. B60G 5/00
[52] U.S. Cl. ..................................... 280/682; 280/686
[58] Field of Search ....................... 280/676, 682, 686

[56] References Cited

U.S. PATENT DOCUMENTS

| | | | |
|---|---|---|---|
| 2,575,065 | 11/1951 | Merry | 280/682 |
| 2,599,469 | 6/1952 | Merry | 280/682 |
| 3,833,236 | 9/1974 | Davis et al. | 280/682 |

Primary Examiner—Kenneth R. Rice
Attorney, Agent, or Firm—Bernard, Rothwell & Brown

[57] ABSTRACT

An equalizing suspension arrangement for tandem steering axles. An extended shackle is provided for supporting the forward end of the rear spring (that is the spring supporting the rear steering axle), and this extended shackle is connected at one end to the rear end of a rocker beam which connects the front spring and rear spring. A radius arm pivoted on the frame of the truck is connected to the opposite end of the extended shackle. As a result of this construction the movement of the rocker beam and of the radius arm are coordinated so that the point of connection of the front end of the rear spring to the extended shackle moves along a substantially vertical path, and there is substantially no horizontal movement of the front support of the rear spring. Hence, there is substantially no horizontal movement of the rear steering axle and the toe-in and toe-out condition of the rear steering axle remains substantially the same as that of the front steering tandem axles.

4 Claims, 3 Drawing Sheets

U.S. Patent
Feb. 26, 1991
Sheet 1 of 3
4,995,634
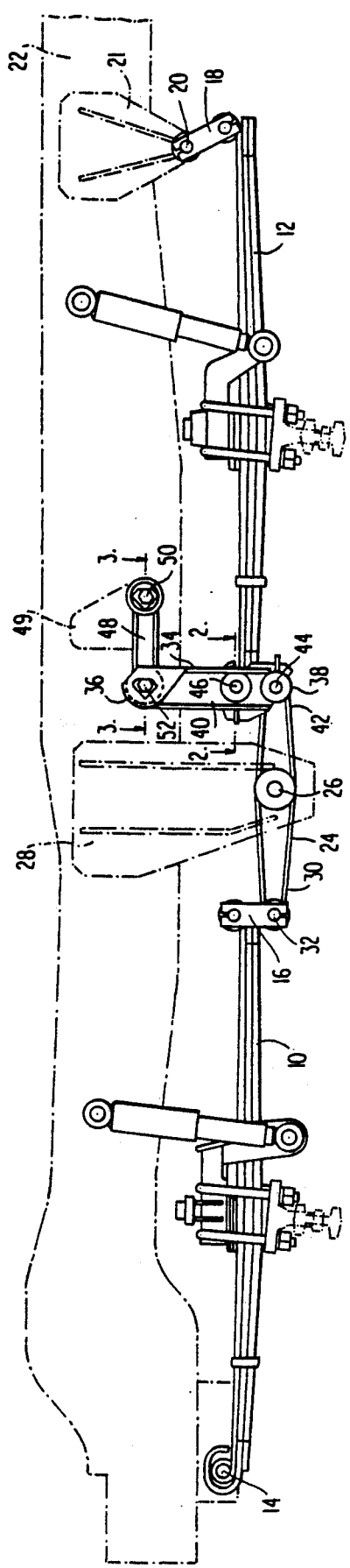
FIG. 1
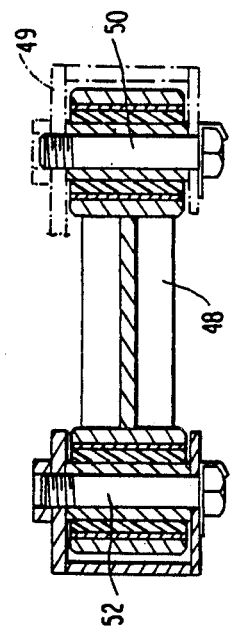
FIG. 3
FIG. 2

EQUALIZING SUSPENSION ARRANGEMENT FOR TANDEM STEERING AXLES WITH COORDINATED GEOMETRY CONTROL OF NO. 2 STEERING AXLE

BACKGROUND OF THE INVENTION

1. Field of the Invention

This invention relates to heavy commercial vehicles employing tandem steering axles, and more specifically to an equalizing suspension arrangement with coordinated geometry control over the movement of the No. 2 steering axle in relation to the No. 1 steering axle.

2. Prior Art

Because of limitations on the maximum weight allowed per axle, it is sometimes necessary in the case of heavy commercial vehicles to provide two steering axles in a tandem arrangement. This gives rise to a problem of coordinating the movement of the two steering axles so that the toe-in or toe-out of the two axles during turning movement and suspension oscillation are substantially the same throughout the turning range.

The front end of the front spring (spring of the forward, i.e., No. 1, steering axle) is attached to the frame of the vehicle at a fixed pivot. As the spring oscillates about this pivot during normal suspension movement, the front axle attached thereto moves in an arc having a radius approximately equal to the front cantilevered length of the spring, that is, the distance from the fixed pivot to the center line of the forward steering axle. Fitted to the outer end of this steering axle is a steering lever. This lever is connected to the steering gear mechanism by a pitman arm and a drag link. A ball joint is provided at each connection point. The drag link pivot points are ideally located so as to minimize the effects of toe-in/toe-out on the axle steering knuckles during normal suspension movement. That is, the scribed arc of the drag link equals the scribed arc of the front cantilevered length of the spring. The pitman arm/drag link pivot connection point is located in the vicinity of the fixed pivot end of the front spring and the drag link/steering lever pivot point is located at the axle roll center. However, due to space limitations and other criteria, the pitman arm/drag link pivot point is sometimes not located at the ideal point in relation to the scribed arc of the front cantilevered length of the spring. As a result, when the suspension oscillates, the axle beam and the drag link/steering lever pivot connection point scribe arcs about two different centers rather than a common center, causing the axle steering knuckles to toe-in or toe-out. This condition causes a change in direction of the vehicle, which must be corrected by moving the steering wheel in the opposite direction.

In a conventional prior art arrangement the shackles at the rear of the front spring and the front of the rear spring are connected to opposite ends of a rocker beam. With this arrangement the rear spring is free to swing between shackles at each end thereof. To maintain the rear steering axle in position under this condition torque rods have been utilized. Since the torque rods are longer than the front cantilevered length of the springs, the suspension articulation is uneven. This in turn causes a change in caster angle of the rear (No. 2) steering axle relative to the forward (No. 1) steering axle, with the result that the toe-in or toe-out condition of the rear steering axle is constantly changing relative to that of the front steering axle. As a result of this ineffective coordination of the movement of the two steering axles, directional control of the vehicle is impaired and there is a very adverse effect on tire wear.

Another prior art arrangement for attempting to equalize the movement is to attach the front end of the rear spring directly to the equalizing rocker beam eye. This has the effect of pulling the rear steering axle forward as the rocker beam articulates. This also changes the toe-in and toe-out condition caused by drag links of the rear steering axle relative to that of the front steering axle, usually in an opposite direction. When this occurs, directional control of the vehicle is impaired and also tire wear rate is adversely affected.

In accordance with the present invention, a suspension system is provided which overcomes the above limitations of the prior art structures and provides precise control over the location of the front end of the rear spring throughout the whole range of rocker beam articulation. By the arrangement of the present invention the caster angle of the rear steering axle remains substantially the same as that of the front steering axle under all conditions and horizontal movement of the rear steering axle is rendered negligible. Further, when there is a change in the toe-in or toe-out condition caused by drag links of the rear steering axle this change is in the same direction as that of the front steering axle and, therefore, vehicle directional control is precise under all conditions. Further, the tire wear rate is significantly reduced.

Accordingly, it is an object of this invention to coordinate movement of tandem steering axles.

It is another object of this invention to geometrically control the arc of movement of the rear (No. 2) steering axle in relation to the forward (No. 1) steering axle and to coordinate the toe-in/toe-out effect in the same direction for both axles, thereby maintaining directional control.

It is another object of this invention to control the movement of the front end of the rear spring, that is the spring associated with the rear (No. 2) steering axle, so as to limit this movement to an essentially vertical path.

It is a further object of this invention to maintain precise directional control of the two steering axles throughout the entire range of rocker beam articulation.

It is a further object of the present invention to provide coordination of the two steering axles so as to reduce tire wear.

SUMMARY OF THE INVENTION

In carrying out this invention in one embodiment thereof an extended shackle is provided for supporting the forward end of the rear spring (that is the spring supporting the rear steering axle), and this extended shackle is connected at one end to the rear end of the rocker beam which connects the front spring and rear spring. A radius arm pivoted on the frame of the truck is connected to the opposite end of the extended shackle. As a result of this construction the movement of the rocker beam and of the radius arm are coordinated so that the point of connection of the front end of the rear spring to the extended shackle moves along a substantially vertical path, and there is substantially no horizontal movement of the front support of the rear spring. Hence, there is substantially no horizontal movement of the rear steering axle and the toe-in and toe-out condition of the rear steering axle remains substantially the same as that of the front steering axle throughout the normal range of movement of these tandem axles.

BRIEF DESCRIPTION OF THE DRAWINGS

FIG. 1 illustrates an embodiment of the tandem steer suspension arrangement of this invention, particularly illustrating the provision for support of the front end of the spring supporting the rear steering axle.

FIG. 2 is a partial sectional view taken along the line 2—2 in FIG. 1.

FIG. 3 is a partial sectional view taken along the line 3—3 in FIG. 1.

DESCRIPTION OF A PREFERRED EMBODIMENT

Figure 4:
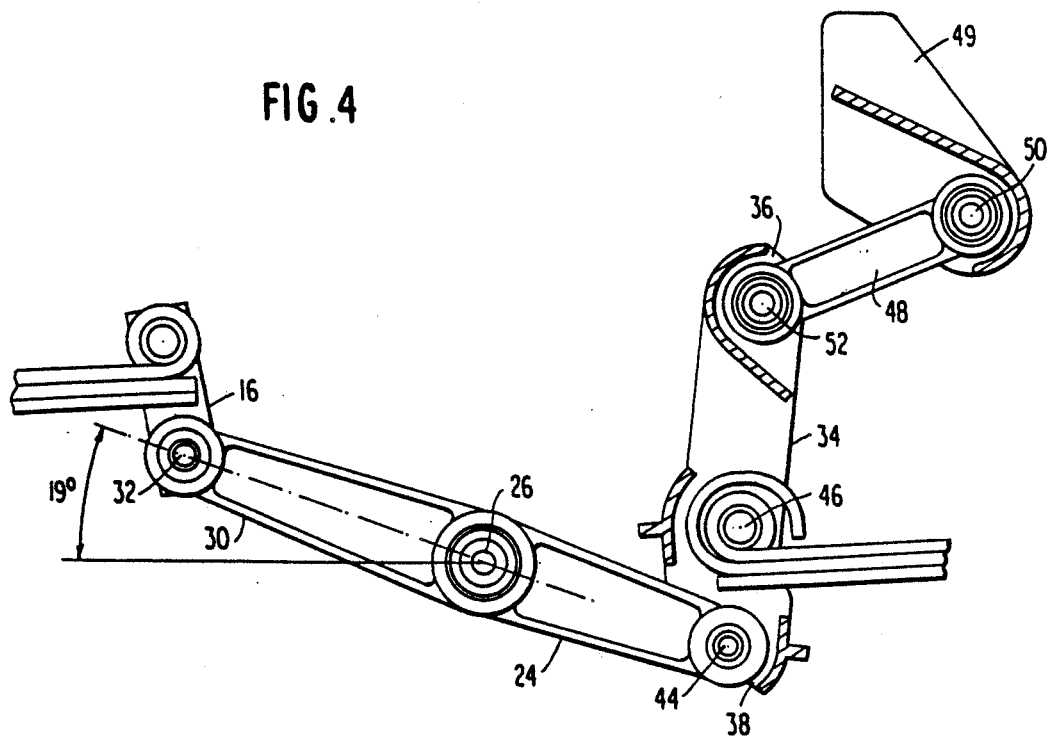
FIGS. 4, 5 and 6 are enlarged views illustrating the positions of the rocker beam, extended spring shackle and radius arm in three positions of movement.

In accordance with this invention in one embodiment thereof a vehicle (not shown) specifically a heavy duty truck having tandem steering axles, is provided, as shown in FIG. 1, with front and rear shackle springs 10 and 12, respectively, for supporting front and rear steering axles. While in FIG. 1 only one front shackle spring and one rear shackle spring are shown, it will be apparent that an application to a vehicle two front springs and two rear springs will be employed, one front spring and one rear spring being disposed at each side of the vehicle frame for supporting the axles near the ends of the axles. For purposes of describing the subject invention it is sufficient to show only the one front spring and one rear spring, it being realized that duplicate elements are positioned on the opposing side of the vehicle frame.

As indicated above, shackle springs are provided for supporting the front and rear steering axles of the vehicle. The front shackle spring includes a fixed mounting at 14 at the forward end thereof. At the rear end the spring 10 is connected to a shackle 16. The rear spring 12 is pivotally-connected at its rear end to one end of a shackle 18. The shackle 18 is pivotally connected at 20 to a member 21 which is fixed to a frame 22 of the vehicle.

Intermediate the front and rear shackle springs 10 and 12, there is mounted a rocker beam 24. The central portion of the rocker beam is pivotally-connected at 26 to a member 28 fixed to the frame 22 to support the rocker beam for pivotal movement. The front end 30 of the rocker beam is pivotally connected at 32 to the shackle 16 of the front spring 10.

In accordance with the present invention, the front end of the rear spring 12 is not connected directly to the rear end of the rocker beam 24 through a conventional shackle. Instead, the front of the spring 12 is connected to an extended shackle 34 having a particular construction and mounting arrangement. Specifically, the extended shackle 34 has a length significantly larger than a conventional shackle and it includes an upper end 36, a lower end 38 and an intermediate portion 40. The extended shackle 34 is pivotally-connected at its lower end 38 to the rear end 42 of the rocker beam by means of a pin 44.

The front end of the spring 12 is pivotally-connected to the intermediate portion 40 of the extended shackle 34 by means of a pin 46 shown in more detail in the sectional view illustrated in FIG. 2.

A radius arm 48, shown in greater detail in FIG. 3, is pivotally mounted on a member 49 by means of a pin 50. The member 49 is fixed to the frame 22. The radius arm 48, in the position shown in FIG. 1, extends in a generally horizontal position forward from the pin 50 and is connected at its forward end to the upper end 36 of the extended shackle 34 by means of a pin 52, also shown in more detail in the sectional view of FIG. 3.

By means of the arrangement described above, movement of the forward end of the spring 12 at the connection to the pin 46 is confined to a substantially straight vertical line. As a result of this limitation on the movement of the rear spring 12, the movement of the front and rear axles is caused to be coordinated throughout the normal range of movement so that the wheels on the front axles and rear axles follow the same general path throughout the normal range of movement. This not only provides better steering control, but significantly reduces tire wear.

Figure 5:
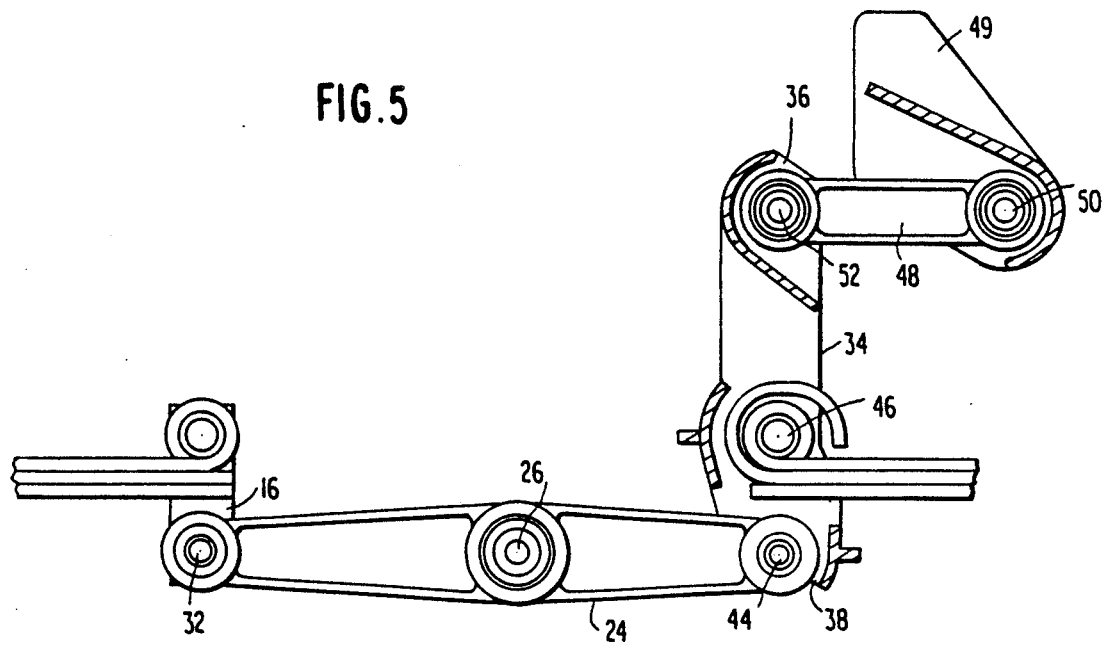
Figure 6:
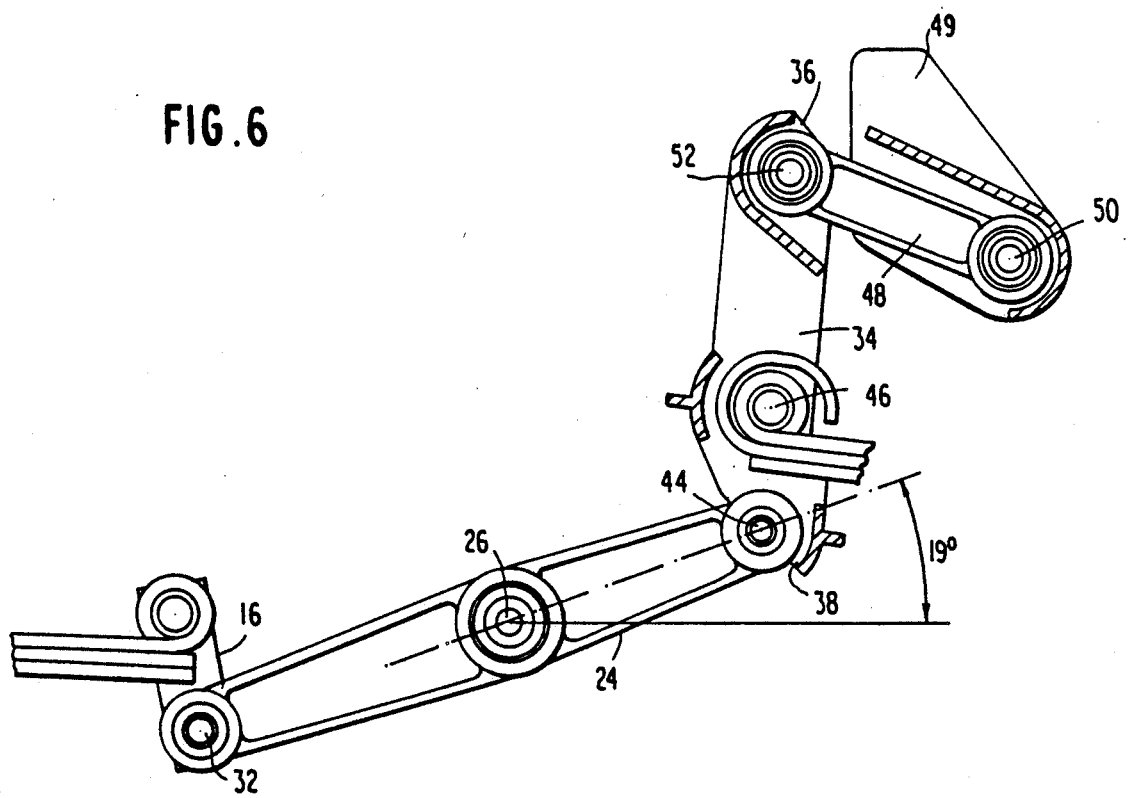

For a better understanding of the relative position of the several elements of the structure of this invention under varying conditions, reference may be had to FIGS. 4–6, which illustrate, on a much enlarged scale as compared to FIG. 1, the positions of these elements in several stages of movement. In FIG. 4 the positions of the rocker beam 24, extended shackle 34 and radius arm 48 are shown at one extreme position of the movement of these elements. FIG. 6 illustrates the position of the same elements at the other extreme position of the movement thereof. FIG. 5 illustrates the position of the elements at an intermediate point in the movement thereof. It can be readily seen, by comparison of FIGS. 4, 5 and 6, that despite the substantial movement of the radius arm 48 and the rocker beam 24 between the positions occupied in FIG. 4 and those occupied in FIG. 6 the extended shackle remains in a substantially vertical position throughout the entire range of movement and the pin 46 on the extended shackle to which the front end of the rear spring 12 is connected moves along a substantially straight vertical line. Thus, unlike a prior art structure employing a conventional shackle at the forward end of the rear spring, the structure disclosed in this invention causes the forward end of the rear spring 12 to move along a substantially straight vertical line with no significant forward or rearward movement thereof.

Figure 7:
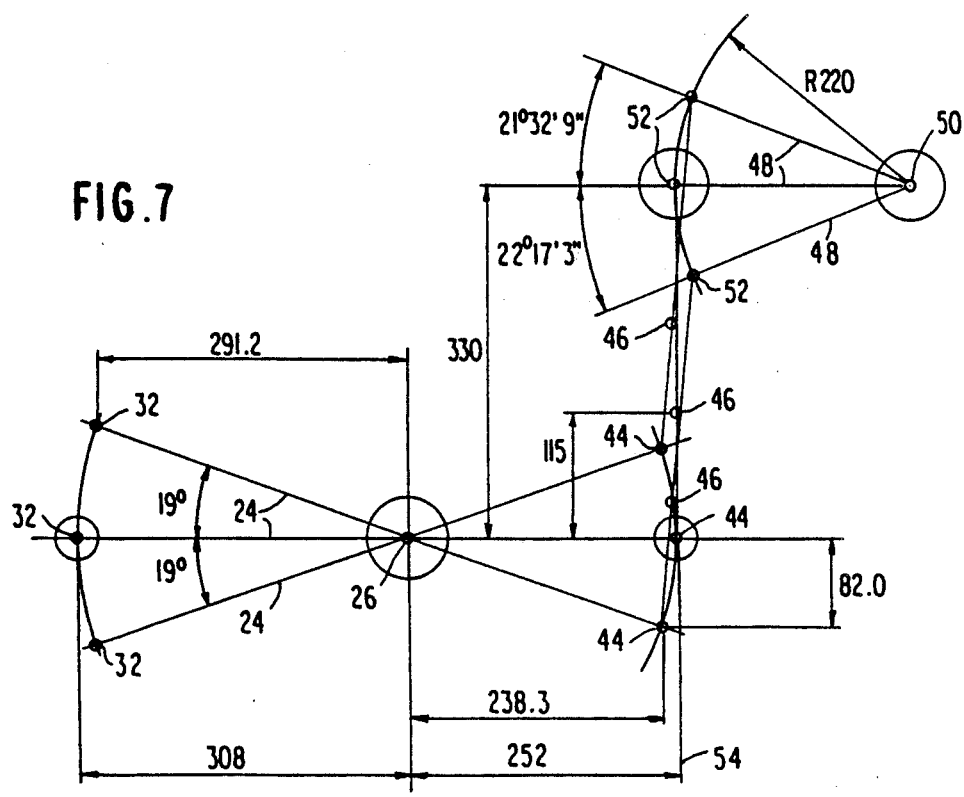
FIG. 7 is a schematic illustration of the movement of the rocker beam, radius arm and front end of the rear spring during the range of movement illustrated in FIGS. 4–6.

FIG. 7 is a schematic diagram illustrating in one schematic figure the movement of the several elements of the structure of this invention throughout the range of movement of these elements. The dimensions given are in millimeters and represent the dimensions employed in the application of the subject invention to one specific vehicle and are illustrated by way of example. More specifically, FIG. 7 illustrates the positions of the pivot points 44, 46 and 52 throughout the range of movement of the rocker beam 24, the extended shackle 34 and the radius arm 48. In FIG. 7 the line 54 represents a vertical line which extends through pivot points 44, 46, and 52 in the mid-positions of the rocker beam 24 and radius arm 48. It can be seen that while the pivot point 46, which represents the point of connection of the forward end of the rear spring 12 to the intermediate portion 40 of the extended shackle 34, does not move precisely along the line 54, it deviates only slightly therefrom. This deviation, in a forward direction, in this specific embodiment, is 3.6 mm. at the upper position of pivot point 46 and 3.2 mm. at the lower position of pivot point 46. This represents a material reduction in the horizontal movement of the forward end of the rear spring 12 compared to prior art structures. Because the horizontal movement of the forward end of the rear spring 12 is controlled in the manner described, the movement of the front and rear axles and the wheels mounted thereon is coordinated so that these axles and the wheels mounted thereon follow substantially the same path during suspension movement of the vehicle from one extreme position to the other. This provides better steering control of the vehicle and reduces the tire wear thereof.

While the equalizing suspension arrangement of this invention is widely useful in heavy commercial vehicles such as heavy trucks, it is also applied to other heavy vehicles, such as crane carriers, drilling rigs, etc.

Although a specific embodiment of the subject invention has been disclosed, it will be apparent that modifications may be made in the details of the embodiment. It is intended, therefore, by the appended claims to cover all such modifications which come within the spirit and scope of this invention.

It is claimed:

1. In a vehicle having tandem steering axles including a front axle and a rear axle and front and rear springs for mounting said axles, an arrangement for coordinating said axles through the full range of movement thereof, said arrangement comprising
   (a) an extended shackle pivotally connected to the front end of said rear spring;
   (b) a rocker beam mounted on the frame of the vehicle between the rear end of said front spring and the front end of said rear spring and pivotally connected to said extended shackle; and
   (c) means for causing movement of said front end of said rear spring to be controlled to a substantially vertical path.

2. The arrangement of claim 1 wherein said means includes a radius arm pivotally mounted on the frame of the vehicle and having a free end pivotally connected to one end of said extended shackle.

3. The arrangement of claim 2 wherein
   (a) one end of said extended shackle is pivotally connected to said free end of said radius arm;
   (b) the other end of said extended shackle is pivotally connected to one end of said radius arm; and
   (c) said extended shackle is pivotally connected at a point intermediate said ends thereof to the front end of said rear spring.

4. The arrangement of claim 1 wherein:
   (a) said extended shackle is positioned in a generally vertical position and includes an upper end and a lower end;
   (b) said rocker beam includes a front end and a rear end, said front end of said rocker beam being pivotally connected to a shackle of said front spring and said rear end of said rocker beam being pivotally connected to said lower end of said extended shackle;
   (c) said free end of said radius arm being pivotally connected to said upper end of said extended shackle; and
   (d) said front end of said rear spring being pivotally connected to said extended shackle at a point intermediate said upper end and said lower end of said extended shackle.

* * * * *

UNITED STATES PATENT AND TRADEMARK OFFICE
CERTIFICATE OF CORRECTION

PATENT NO. : 4,995,634

DATED : February 26, 1991

INVENTOR(S) : Maxwell W. Evans

It is certified that error appears in the above-identified patent and that said Letters Patent is hereby corrected as shown below:

On the title page, item [75], delete "Maxwell E. Evans" and insert therefor --Maxwell W. Evans--.

Signed and Sealed this

Eighth Day of September, 1992

Attest:

DOUGLAS B. COMER

*Attesting Officer*  *Acting Commissioner of Patents and Trademarks*